March 13, 1962  G. A. LYON  3,025,111
WHEEL COVER
Filed March 10, 1959  2 Sheets-Sheet 1
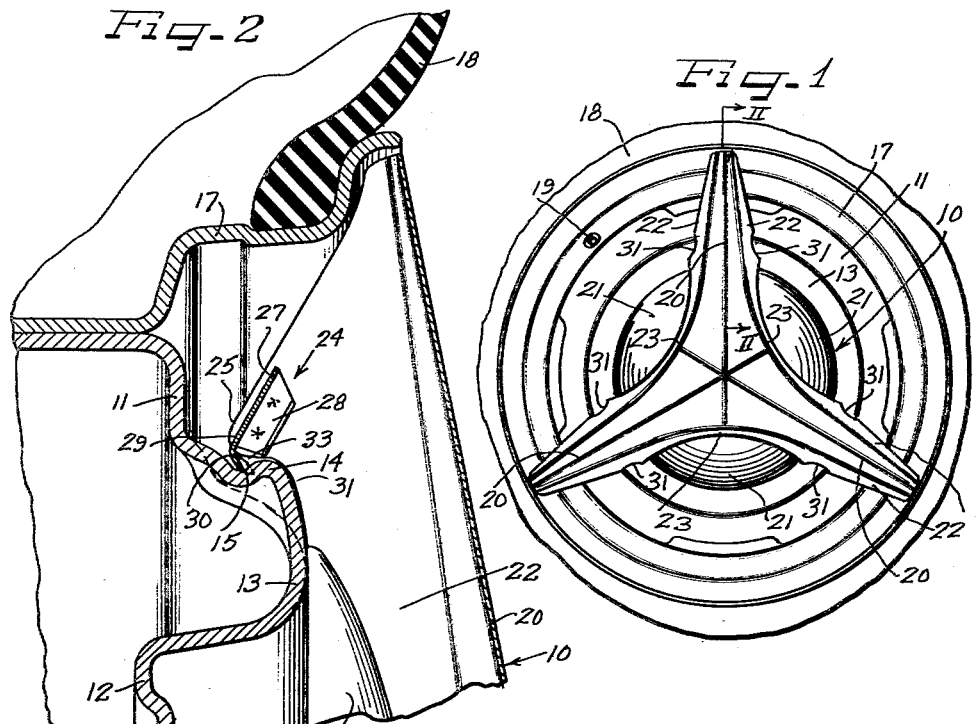
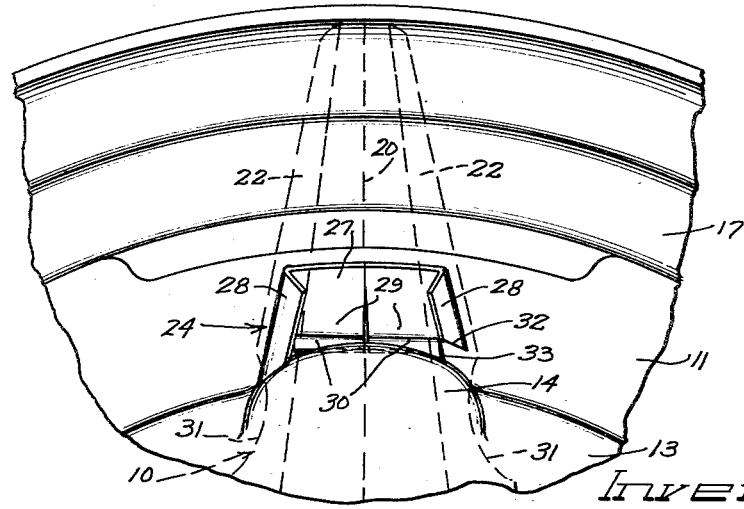
Inventor
George Albert Lyon March 13, 1962
G. A. LYON
3,025,111
WHEEL COVER
Filed March 10, 1959
2 Sheets-Sheet 2
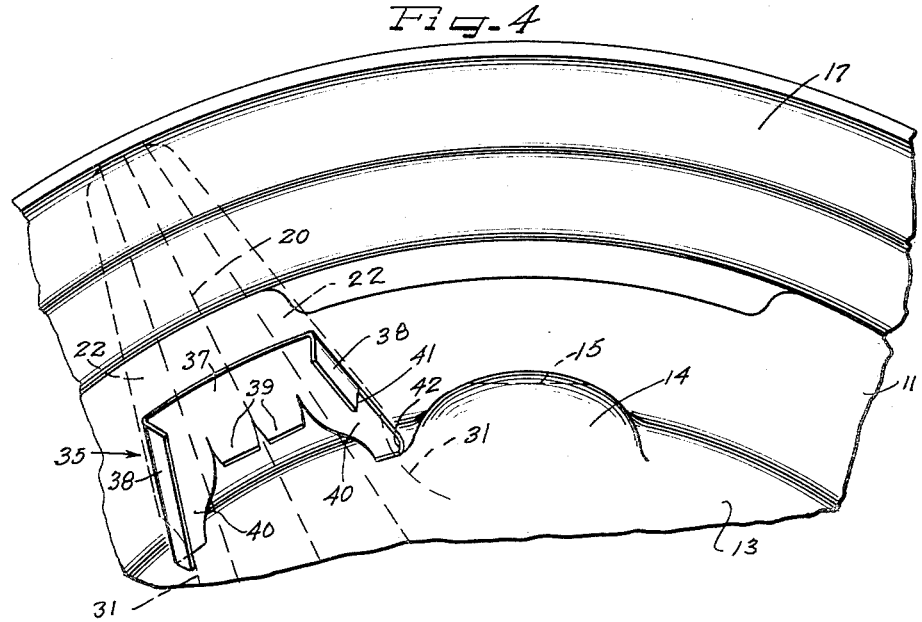
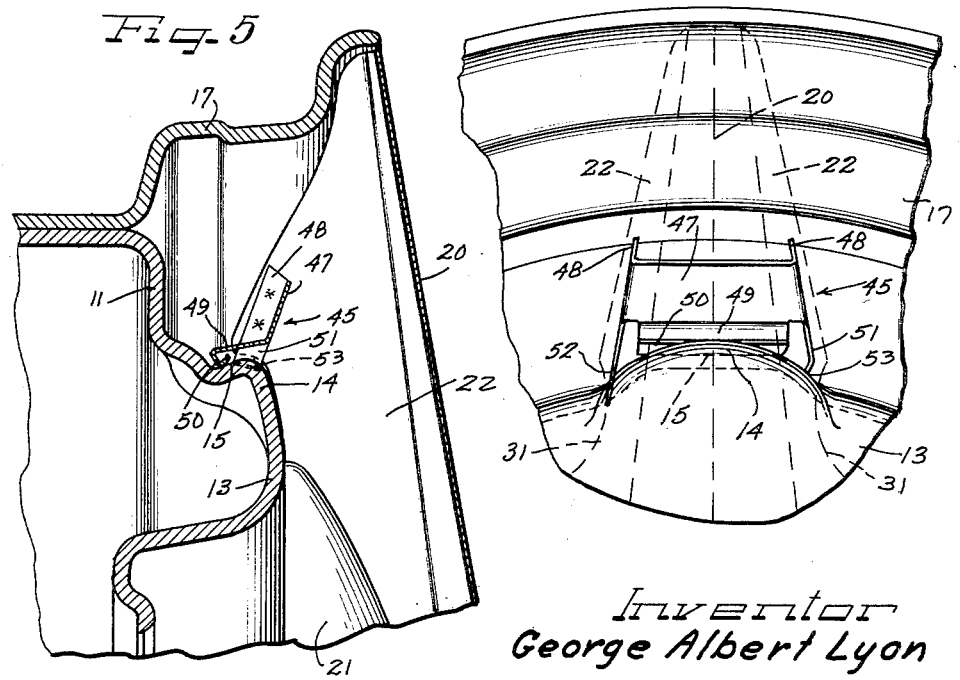
Inventor
George Albert Lyon United States Patent Office 3,025,111
Patented Mar. 13, 1962

3,025,111
WHEEL COVER
George Albert Lyon, Detroit, Mich., assignor to Lyon Incorporated, Detroit, Mich., a corporation of Delaware
Filed Mar. 10, 1959, Ser. No. 798,384
9 Claims. (Cl. 301—37)

The present invention relates to improvements in wheel structures and more particularly concerns the ornamental and protective covering of the outer sides of vehicle wheels.

An important object of the present invention is to provide an improved hub cap type wheel cover for disposition over the outer side of a vehicle wheel including a wheel body and a tire rim wherein at least one of the wheel members has generally radially projecting cover retaining protrusions or bumps with retaining shoulders and the cover member has spoke arms provided with retaining clips arranged for retaining engagement with the retaining shoulders of the bumps.

Another object of the invention is to provide an improved wheel cover having retaining clips adapted to engage with retaining bumps on a wheel by relative rotary assembly movement of the cover relative to the wheel.

A further object of the invention is to provide a hub cap having integral hollow spoke arms radiating therefrom and provided therebehind with cover retaining clips engageable with retaining bumps on a vehicle wheel body.

Still another object of the invention is to provide a wheel cover member having retaining clip means enabling the cover member to be applied in retained engagement over the outer side of a vehicle wheel provided with retaining bumps by either a rotary assembly movement or by a press-on axial assembly movement and in which the cover member may be removed either by a pry-off axially outward action or by a rotary disassembly action.

Other objects, features and advantages of the present invention will be readily apparent from the following detailed description of certain preferred embodiments thereof taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a fragmentary outer side elevational view of the wheel showing one of the retaining bumps and showing schematically the manner in which the retaining clip structure associated with one of the spoke arms of the hub cap cover member engages the retaining bump;

FIGURE 4 is a fragmentary outer side elevational view of a wheel showing the manner in which a modified form of retaining clip structure is adapted to be assembled with the wheel preparatory to engagement with a retaining bump by a relative rotary movement of the cover carrying the retaining clip;

FIGURE 5 is a radial sectional detail view similar to FIGURE 2 but showing a modified form of retaining clip; and FIGURE 6 is an outer side elevational view similar to FIGURE 3 but showing the modified clip of FIGURE 5.

A cover member 10 FIGS. 1, 2 and 3 is adapted to be applied to the outer side of a vehicle wheel including a wheel body 11 of the disk spider type having a central bolt-on flange 12, an intermediate annular axially outwardly projecting nose bulge 13 equipped with a plurality such as three circumferentially spaced radially outwardly projecting cover retaining bumps or protrusions 14 each of which has a wheel body-overhanging generally radially outwardly and axially inwardly facing cover retaining shoulder 15. A multi-flange, drop center tire rim 17 is carried by the wheel body 11 and is adapted to support a pneumatic tire such as a tubeless tire 18 inflation of which is adapted to be effected through a valve stem 19 carried by the tire rim.

According to the present invention, the cover member 10 is in the form of a drawn sheet metal shell which may be made from any suitable material such as stainless steel, cold rolled steel, or the like provided with a suitable external finish. While the cover member is in the illustrated example shown as primarily a hub cab for overlying the central portion of the wheel and of a basic diameter such as to overlie at least partially the nose bulge 13, and as illustrated adjacent to the radially inner ends of the retaining bumps 14, while radially projecting arm spokes 20 emanate integrally in one piece from the central cap portion into overlying relation to the retaining bumps 14. In a rigid construction the spoke arms 20 have angularly related crown panels joining at the center of the cap in a more or less faceted relation, with cap segment panels 21 between the arms and connecting side walls 22 defining the arms. The adjacent side walls 22 of adjacent arms are connected together by integral connecting flanges 23 which are disposed angularly to the crown panels of the arms and also to the contiguous cap segmental portions 21. This affords a structure of substantial rigidity. In the illustrated instance, the spoke arms 20 project to a diameter for overlying the tire rim 17 but with the tips of the spoke arms located protectively within the terminal flange of the tire rim.

For retaining the cover member 10 on the wheel, each of the spoke arms 20 is provided with a cover retaining spring clip 24 therebehind and carried by the side walls 22 thereof. To this end, the side walls 22 are provided with generally axially inwardly projecting portions 25 adapted in assembly to oppose the radially outer side of the nose bulge 13 at opposite sides of and radially outwardly from the associated retaining bump 14. In a desirable form, each of the retaining clips 24 is of generally U-shape cross-section comprising a body portion 27 of a preferred length and of a width to extend between the axially inwardly extending ear-like side wall extensions 25, with upturned attachment flanges 28 at opposite sides of the body 27 secured as by means of welding fixedly to the side wall portions 25 engaged thereby.

At its radially inner end, the retaining clip body 27 is provided with means retainingly engageable with the retaining bump shoulder with which associated in the assembled relationship of the cover unit 10 upon the wheel. In a desirable form, such retaining means comprise resiliently flexible retaining finger structure which for improved resilient flexibility includes a plurality, herein two, relatively resiliently flexible retaining fingers 29 into which the radially inner portion of the clip body 27 is subdivided by generally radial slitting thereof. For enhancing the retaining gripping engagement of the fingers 29 with the bump shoulder 15, each of the fingers 29 has a short and stiff generally radially inwardly and axially outwardly angled and in this instance oblique, turned gripping terminal flange 30, the plane of which is preferably substantially normal to the retaining shoulder 15 so as to afford a substantially direct edgewise gripping engagement of the finger edges against the bump shoulders. In order to afford a tensioned retaining engagement of the finger terminals 30, they normally extend to a diameter at variance with the diameter of the engaged retaining shoulders 15, by being on a slightly smaller diameter so that in engagement with the retaining bump shoulders the retaining fingers are placed under resilient deflection and thus are tensioned so that the edges of the retaining terminals 30 thrust effectively into retaining engagement with the bump shoulders.

While it is possible to apply the cover member 10 to the outer side of the wheel by a snap-on action wherein one or more of the retaining bumps 14 is engaged with the retaining bump or bumps and then axially inward pressure imposed upon the cover to snap the remaining retaining finger 29 into engagement with the associated bump. However, a sometimes easier manner of applying the cover, avoiding the necessity for finding the retaining bumps for registration with the retaining clip fingers, is provided for herein, enabling turning of the cover into the retained engagement. To this end, a portion of the cover is adapted to be placed initially into seated or bottomed engagement against the outer side of the wheel, determining its axially inward disposition and with the spoke arms 20 torsionally out of phase with the retaining bumps, that is disposed between the retaining bumps. For example, the free edges of the cap segments 21 being in bearing engagement with the crest of the nose bulge 13 and the tips of the spoke arms 20 serving generally as centering guides within the terminal flange of the tire rim, the side walls 22 of the spoke arms being, however, spaced from the tire rim in sufficient clearance relation to accommodate the usual tolerance with respect to relative axial disposition of the wheel body 11 and the tire rim 17. After thus bottoming and generally centering the cover member 10 with respect to the wheel, the cover member is turned, utilizing the spoke arms 20 as handles until the retaining bumps 14 are received in registration behind the spoke arms, there being provided in the spoke arms side walls 22 in circumferential alignment with the retaining bumps 14 clearance cutout notches 31 so that interference with turning movement will be avoided.

As the retaining clips 24 are carried by the respective spoke arms 20 toward the respective retaining bumps 14, in a normal clockwise direction the respective retaining bumps are cleared past the clip attachment flange 28 at the clockwise circumferential side of each clip as enabled by a cutback 32 of the affected flange 28. Then, in the continuing clockwise rotary movement of the cover member a lead-in turned leading corner portion 33 of the adjacent retaining terminal 30 engages the approach side of the retaining bump and rides onto the retaining bump shoulder 15 to thereby clearingly flex the associated retaining finger and more particularly the terminal 30 thereof for riding onto the associated retaining bump shoulder 15, the companion retaining finger following into such engagement. In the fully registered, assembled relation and generally radial alignment of the retaining clips 24, the trailing side attachment flange 28 engages at its radially inner end portion as a stop against the approach side of the retaining bump in one or more instances as best seen in FIG. 3 to avoid overrunning and also to prevent torque or torsional displacement in service in a clockwise direction. Counterclockwise torsional displacement in service is resisted by the turned leading cam edge portion 33 which snaps into opposition to a portion on the adjacent clockwise side of the retaining bump in the fully registered relation of the retaining clips to the bumps and thus serves as a turn-resisting shoulder on that side of the bump cooperative with the turn-resisting shoulder provided by the inner end portion of the attachment flange 28 at the other side of the bump.

Removal of the cover member from the wheel may be effected by counterclockwise turning to reverse the action just described with respect to turn-on application of the cover. On the other hand, a pry-off tool may be inserted behind the spoke arms 20 and more particularly the retaining clips 24 to pry the same free from the respective retaining bumps. However, in applying a pry-off tool great care must be taken to avoid damaging the retaining clips and the spoke arms and it is therefore safer to apply a twisting counterclockwise cover-removing manual action through the substantially rigid spoke arms 20 serving as handles to effect removal of the cover.

In FIG. 4 a modified cover retaining clip 35 is shown, all other parts of the disclosure being substantially identical to FIGS. 1–3 and the same reference numerals designating identical parts. In this form, the retaining clip 35 has a body portion 37 of a width to span between the side walls 22 of the spoke arm 20 and respective side flanges 38 of the generally U-shape clip are secured as by welding to the inner faces of the arm side walls 22. In this instance the retaining clip has one or more resiliently flexible generally radially inwardly projecting bump shoulder engaging retaining fingers 39 in the central portion thereof, with bump side opposing longer generally radially inwardly projecting fingers 40 at each side of the bump shoulder engaging fingers. At the circumferentially clockwise side of the clip 35 the attachment flange 38 is cutback at 41 to leave the adjacent bump side engaging finger free to flex resiliently axially so that in turning the cover into registration with the retaining bumps 14 from the position shown in FIG. 4, the flexible finger will be flexed to clear over the retaining bump 14 as a turned up cam terminal 42 thereon rides onto the approach side and over the nose of the retaining bump in the continuing turn-on movement of the cover.

At the opposite or circumferentially clockwise side of the retaining clip 35, the attachment flange 38 preferably extends coextensively with the bump side engaging finger 40 and thus reinforces the same against axial flexure displacement so that when such finger 40 engages the side of the bump it will serve as an overrun preventing stop as the leading side finger 40 snaps into opposition to the clockwise side of the retaining bump. This arrangement is especially desirable for use with high speed automobile wheels where unusual torque stresses in service must be countered.

In the form of the invention shown in FIGS. 5 and 6, again, the details of the wheel and the cover are substantially identical to the wheel and cover of FIGS. 1–3 and are therefore similarly identified by the same reference numerals, but a form of retaining clip 45 is disclosed which is especially constructed to facilitate pry-off if desired although the construction is such as to be especially suitable for turn-on assembly interengagement of the cover with the wheel. To this end, the retaining clip 45 is in the form of an inverted U-shape resilient sheet metal member having a body portion 47 of a width to bridge between the side walls 22 of the spoke arm 20 and with side flanges 48 secured as by welding to the inner faces of the axially inwardly projecting portions 25 of the side walls.

Projecting generally axially inwardly from the inner end portion of the clip body 47 is a resiliently flexible retaining finger 49 provided with a generally radially inwardly projecting turned terminal 50 engageable with the retaining shoulder 15 of the bump under resilient tension of the retaining finger 49 by slight deflection of the retaining finger from a slightly smaller diameter normal projection of the turned terminal 50.

At the circumferentially clockwise side of the retaining clip 45 the attachment wall 48 is provided with a radially inward projection 51 of a length to oppose the adjacent side of the retaining bump 14 while at the opposite side of the retaining clip the attachment flange 48 is provided with an inward extension 52 for opposing the approach side of the retaining bump.

In applying the cover member to the wheel, a snap-on action may be chosen wherein general alignment of the retaining clips 45 with the retaining bumps 14 is effected and then axially inward pressure applied. However, a turn-on action may be effected by seating of the cover on the outer side of the wheel and then turning the same into retained engagement of the retaining clips 45 similarly as described in connection with FIGS. 1–3. In such turn-on action, a turned cam leading inner end portion 53 of the flange extension 51 cams over and past the retaining bump until the opposite side flange 52 engages the approach side of the bump as a stop and the flange extension 51 snaps into opposition to the clockwise side of the bump so that the opposed spaced flanges 51 and 52 hold the retaining fingers in retaining alignment with the retaining bumps.

In all forms of the invention, of course, the location of the retaining finger terminals axially relative to the associated spoke arms 20 is such that upon engagement of the retaining terminals with the retaining bump shoulders there is a tendency toward axially inward camming of the terminals along the slope of the retaining shoulders to draw the spoke arms axially inwardly and thus effect a firm bottoming of the cover member against the nose bulge 13 of the wheel body.

It will be understood that modifications and variations may be effected without departing from the scope of the novel concepts of the present invention.

I claim as my invention:

1. In a wheel structure including a tire rim and a supporting disk spider wheel body having an annular intermediate axially outwardly projecting nose bulge provided at circumferentially spaced intervals with generally radially outwardly projecting retaining bump protrusions with wheel body-overhanging radially outwardly and axially inwardly facing retaining shoulders, a substantially rigid hub cap of a diameter to overlie the central portion of the wheel body and at least a portion of said nose bulge and having radially outwardly projecting spoke arms of a number and spacing matching the number and spacing of the retaining bumps, and respective retaining clips separately formed but secured to and behind said spoke arms and having resiliently flexible finger flanges engageable under resilient flexible tension retainingly with said bump shoulders and thereby retaining the hub cap member in place on the wheel and drawn axially inwardly tightly against the wheel, said finger flanges comprising in each clip a plurality of fingers which are relatively resiliently flexible and have individual terminals engaging the respective bump shoulder, one of said fingers having a turned cam shoulder at one side enabling turn-on interengagement with the retaining bump from that side.

2. In a cover for disposition over the outer side of a vehicle wheel, a shell body having a plurality of generally radially extending hollow arms, said arms having secured therein separately formed generally U-shaped cover retaining clips provided with terminal flange structure projecting generally radially for retaining engagement with a part of a vehicle wheel.

3. In a cover for disposition over the outer side of a vehicle wheel, a shell body having a plurality of generally radially extending hollow arms, said arms having secured therein separately formed cover retaining clips provided with structure thereon for retaining engagement with a part of a vehicle wheel, said arms having side walls defining the hollow space within the arms and said clips bridging between and having attachment flanges secured to said side walls.

4. In a hub cap wheel cover member, a central hollow shell having projecting radially therefrom spoke arms hollow axially inwardly and defined by side walls spaced apart, generally U-shaped cover retaining clips having attachment flanges secured to said side walls, and cover retaining terminal means between said clip flanges projecting generally radially for engagement with cover retaining bumps on a wheel to which the hub cap may be applied.

5. In a hub cap wheel cover member, a central hollow shell having projecting radially therefrom spoke arms hollow axially inwardly and defined by side walls spaced apart, generally U-shaped cover retaining clips having attachment flanges secured to said side walls, and cover retaining terminal means between said clip flanges projecting generally radially for engagement with cover retaining bumps on a wheel to which the hub cap may be applied, said clips having portions thereon which project radially beyond said terminal means and are engageable with the opposite sides of retaining bumps with which the terminal means of the clips is engageable.

6. In a wheel structure including a wheel body having an axially outwardly projecting annular nose bulge provided at its radially outer side with radially outwardly projecting cover retaining bumps with wheel body overlying radially outwardly and axially inwardly facing retaining shoulders, a hub cap having a central cap portion provided with edge structure bearingly engageable against the crest of the nose bulge and with generally radially projecting spoke arms extending from the cap radially outwardly beyond the nose bulge and substantially complementary to said bumps for overlying the bumps concealingly, said arms having secured therein separately formed retaining clips engageable in tensioned retaining engagement with the shoulders of the bumps to retain the hub cap on the wheel and with said edge structure pressed against the nose bulge.

7. In a wheel structure including a wheel body having an annular axially outwardly projecting nose bulge with radially outwardly projecting retaining bumps on the radially outer side thereof, a central hub cap for the wheel having a central cap portion for overlying the wheel inclusive of at least a portion of the nose bulge and provided with radially outwardly projecting hollow arms matching the retaining bumps and opening theretoward in concealing relation to the bumps, said arms having therein generally U-shaped retaining clips with circumferential side flanges secured to the arms and between such flanges radially inwardly directed cover retaining finger means engageable under resilient retaining tension with the shoulders of the bumps, said arms and said clip flanges at one side of the arms affording clearance for passage of the bumps for rotary assembly movement of the hub cap with the wheel to engage the retaining fingers of the clips with the shoulders of the bumps by approach from one side of the bumps.

8. In a wheel structure including a wheel body having an annular axially outwardly projecting nose bulge with radially outwardly projecting retaining bumps on the radially outer side thereof, a central hub cap for the wheel having a central cap portion for overlying the wheel inclusive of at least a portion of the nose bulge and provided with radially outwardly projecting hollow arms matching the retaining bumps and opening theretoward in concealing relation to the bumps, said arms having therein generally U-shaped retaining clips with circumferential side flanges secured to the arms and between such flanges radially inwardly directed cover retaining finger means engageable under resilient retaining tension with the shoulders of the bumps, said side flanges of the clips having radially inward extensions engageable with the respective opposite sides of the bumps to maintain the clips in registration with the bumps.

9. In a wheel structure including an outer side wheel portion having generally radially extending retaining projections with generally axially inwardly facing retaining shoulders, a cover member for disposition over the outer side of the wheel having therebehind a plurality of separately formed attached cover retaining spring clips provided with resiliently flexible retaining terminal flange structure engageable with said shoulders and at one side of the terminal flange structure a turned cam lead-in end portion movable circumferentially cammingly over and past the projections for engaging the retaining terminal flange structure of the clips with said shoulders by turning of the cover relative to the wheel into registered relationship of the clips with the projections.

References Cited in the file of this patent

UNITED STATES PATENTS

| | | |
|---|---|---|
| Re. 18,692 | Clark | Dec. 20, 1932 |
| D. 93,223 | Horn | Sept. 4, 1934 |
| 1,201,926 | Blackwood | Oct. 17, 1916 |
| 2,119,991 | Hunt | June 7, 1938 |
| 2,675,271 | Lyon | Apr. 13, 1954 |
| 2,819,929 | Hunt | Jan. 14, 1958 |